United States Patent [19]

Hirano et al.

[11] Patent Number: 4,781,457

[45] Date of Patent: Nov. 1, 1988

[54] LASER SURVEYING EQUIPMENT

[75] Inventors: Satoshi Hirano; Takuji Sato; Hiroshi Nishikatsu, all of Tokyo, Japan

[73] Assignee: Tokyo Kogaku Kikai Kabushiki Kaisha, Tokyo, Japan

[21] Appl. No.: 715,571

[22] Filed: Mar. 25, 1985

[30] Foreign Application Priority Data

Mar. 24, 1984 [JP] Japan .................................. 59-55288
Mar. 29, 1984 [JP] Japan .................................. 59-59356

[51] Int. Cl.$^4$ .............................................. G01C 9/12
[52] U.S. Cl. ..................................... 356/250; 356/149
[58] Field of Search ................ 350/286, 287; 356/148, 356/149, 248, 250, 249; 33/286, DIG. 21

[56] References Cited

U.S. PATENT DOCUMENTS 3,936,197 2/1976 Aldrink et al. ...................... 356/250
4,053,239 10/1977 Tolmon ............................... 356/250
4,221,483 9/1980 Randon ............................... 356/250

Primary Examiner—F. L. Evans
Attorney, Agent, or Firm—Browdy & Neimark

[57] ABSTRACT

A laser surveying equipment includes a laser beam luminous section, a suspending reflection member suspended in such a manner as to reflect laser beam radiated from the laser beam luminous section upward and always to direct the optical axis of such reflected light in the perpendicular direction, and a projection lens system adapted to project the laser beam after forming it into a generally parallel flux of light. A rotary reflection member can be rotatably arranged in order to displace by approximately 90 degree an optical path of parallel flux of light obtained from the projection lens system and to scan the parallel flux of light toward a surveying object within a horizontal plane.

11 Claims, 3 Drawing Sheets

FIG. 1
FIG. 2
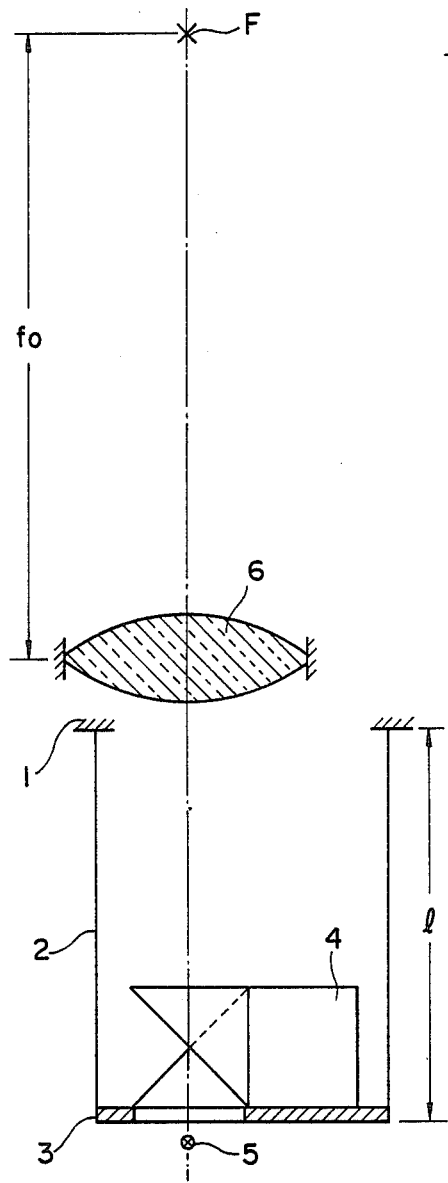
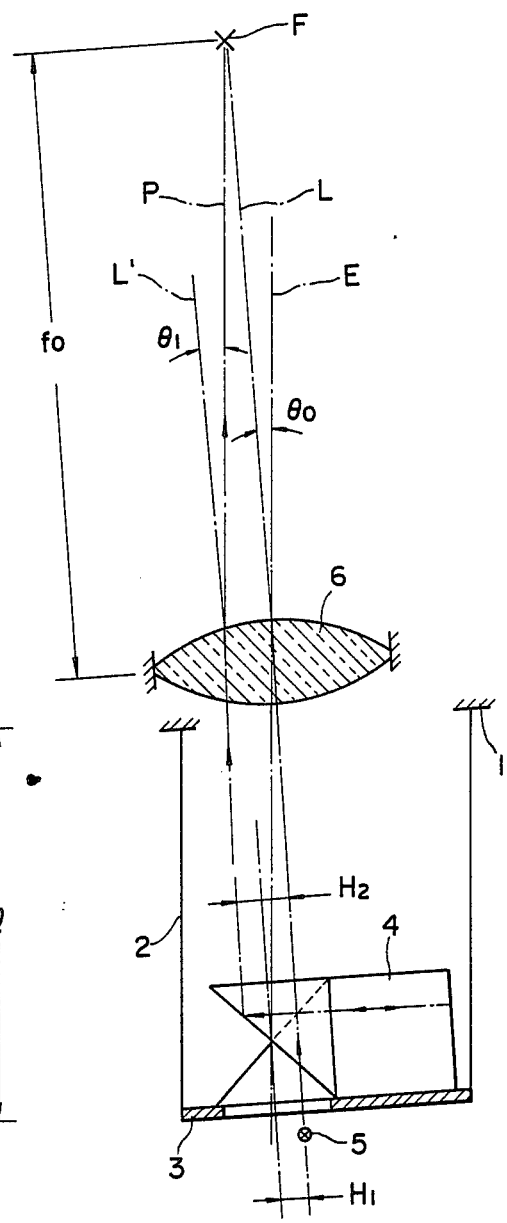

LASER SURVEYING EQUIPMENT

FIELD OF THE INVENTION

The present invention relates to an improvement of a laser surveying equipment of a type which carries out a survey by scanning a laser beam radiated toward a surveying object within a horiozontal plane, or by directing the same in the perpendicular direction.

BACKGROUND OF THE INVENTION

There is known a laser surveying equipment which is used for a leveling by a radiating laser beam scanned within a horizontal plane toward a surveying object and detecting the height of position on the surveying object where the laser beam has reached it, either with the surveyor's naked eyes or photoelectrically, or which is used to shiftingly set a datum point on the earth in the perpendicular direction by directing the laser beam in the perpendicular direction. In this case, since the laser beam is always required to be scanned within a genuine horizontal plane or to be directed in the perpendicular direction, when the equipment is to be installed, it must be adjusted with special care.

In view of the above, a laser surveying equipment is proposed, wherein an adjusting device is incorporated so that even in the case that the equipment is on an incline, the radiating direction of the laser beam would be directed toward a preset direction.

As one of this kind of laser surveying equipment, there is known equipment which is constituted in such a manner as that an illumination tube having a radiating face of a laser beam at the lower end thereof is suspended from the equipment, thereby directing the radiating direction of the laser beam in the perpendicular direction in order to scan within a horizontal plane through a rotary reflecting member provided below, or so that the laser beam can be directly directed toward the perpendicular direction.

However, with the above constitution, an electric wire adapted to supply power for operating the laser illumination tube often disturbs the effective suspension of the laser illumination tube. Besides, highly accurate adjustment cannot be obtained in this prior art.

Also, there is known another conventional equipment, wherein a laser beam is radiated from a semiconductor laser, and beneath this semiconductor laser a projection lens for forming the outgoing laser beam into a parallel flux of light is suspended, thereby directing the laser beam from this projection lens directly in the perpendicular direction, or scanning it within a horizontal plane by a rotary pentagonal prism.

However, with this constitution, there is such a disadvantage as that since the radiating direction of the laser beam is downward, when it is scanned by the rotary pentagonal prism, the laser beam directed in parallel is blocked by a framework of the equipment. Accordingly, surveying accuracy with respect to a certain direction is reduced, or otherwise it is practically impossible to make a survey.

The present invention was accomplished in order to overcome the above mentioned disadvantages.

SUMMARY OF THE INVENTION

It is therefore an object of the present invention to provide a laser surveying equipment which can be adjusted in order to always scan the laser beam radiated toward a surveying object within a genuine horizontal plane and to optionally direct it toward a genuine perpendicular direction.

In order to obtain the above object, there is essentially provided a first invention comprising: a suspending reflection member adapted to reflect a laser beam upward from a laser beam luminous section; and a projection lens system adapted to project the laser beam toward a surveying object after forming it into a generally parallel flux of light, an optical axis of reflection light from said suspending reflection member being normally directed toward the perpendicular direction so that a stable and high accuracy laser beam scanning can be always carried out almost in any direction.

There is also provided a second invention comprising: a suspending reflection member adapted to reflect laser beam upward from a laser beam luminous section; a projection lens system adapted to project the laser beam toward a surveying object after forming it into a generally parallel flux of light, an optical path of the generally parallel flux of light from said projection lens system being shifted by approximately 90°, while an optical path of such reflected light from said suspending reflection member is always directed toward the perpendicular direction, so that a stable and high accuracy laser beam scanning can be always carried out particularly in the horizontal direction.

The above and other objects and features of the present invention will become apparent to those skilled in the art upon reading the following detailed description with reference to the accompanying drawings in which:

BRIEF DESCRIPTION OF THE DRAWINGS

FIG. 1 and FIG. 2 are schematic constitutional views of an optical system in order to explain the principle of the present invention, wherein FIG. 1 is a view showing when a laser surveying equipment according to the invention is not declined, and FIG. 2 is a view similar to the above but showing when the equipment is declined;

DESCRIPTION OF THE PREFERRED EMBODIMENTS

Figure 3:
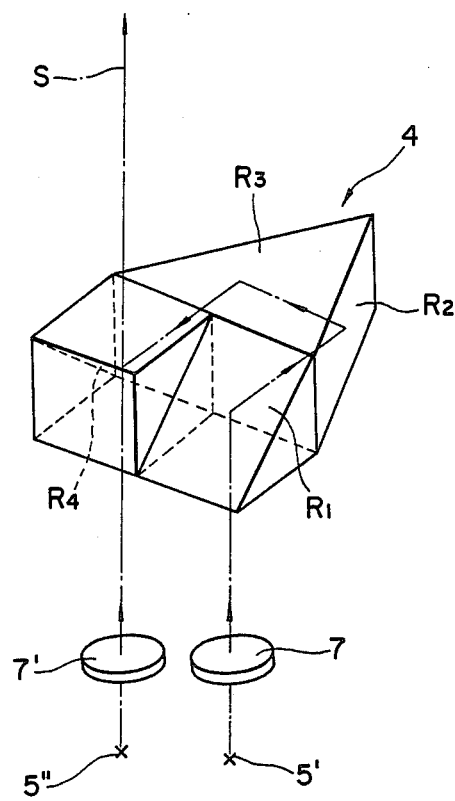
FIG. 3 is a perspective view for explaining a Porro prism.

FIG. 1 and FIG. 2 are schematic views for explaining the principle of the present invention. In the figures, 1 denotes a laser surveying equipment, from which a mounting table 3 is suspended by four ribbons 2. A Porro prism 4 is firmly secured to said table 3. A light source is arranged beneath the Porro prism 4. Above the Porro prism 4, a projection lens 6 having a focal distance $f_o$ is provided to form the light from said light source 5 into a parallel flux of light. In this example, the length l of the ribbons 2 is set to be one half of the focal distance $f_o$.

With the above constitution, when the equipment 1 is declined by angle $\theta o$ with respect to perpendicular axis E, said Porro prism 4 is moved by distance $H_1$, i.e., $l\theta o = f_o \theta o /2$, from optical axis L of the projection lens 6. In this case, the $\theta o$ is a microangle and such a relation as $\theta o = \tan \theta o$ is obtained. On the other hand, since the light source 5 is positioned on the optical axis L of the projection lens 6, flux of light entered into the Porro prism 4 is reflected four times therein, and then directed toward the direction away by distance $H_2$, i.e., $2\ l\theta o = f_o \theta o$, from the optical axis L. Accordingly, the flux of light which enters into the projection lens 6 is moved in parallel by $f_o \theta o$ with respect to before when the equipment 1 was declined. Because of the foregoing, flux of light P which passed through the projection lens 6 is directed toward the angle $\theta_1$ direction with respect to axial line L' parallel to the optical axis L. Such directed direction is on the focal position F of the projection lens 6. In other words, a relation $f_o \theta 1 = f_o \theta o$ is always obtained, and even when the equipment 1 is declined by $\theta o$, the flux of light passing through the projection lens 6 is always parallel to the perpendicular direction E. Such a phenomenon is likewise produced, even when the equipment 1 is declined in the perpendicular direction with respect to a surface of paper.

A specific example of the Porro prism 4 is illustrated in FIG. 3. The light emitted from a first light source 5' is directed toward the upward direction through a converging lens 7, reflected on first through fourth reflecting surfaces $R_1$, $R_2$, $R_3$, and $R_4$, and radiated upward. This radiating direction S is in agreement with the optical axis direction of the light (directed toward the upward direction through a converging lens 7') from a second light source 5" provided beneath the fourth reflecting surface $R_4$. That is to say, two different beams of light are brought to be duplicated one upon the other in the same radiating direction S. When a semiconductor laser radiating infrared light is employed as the first light source 5' and a light source of visible light is employed as the second light source 5", if the reflecting surface $R_3$ is formed into a reflecting surface having a wavelength selecting property which reflects the infrared light and allows the visible light to penetrate therethrough, two beams of infrared and visible light can be projected without producing a loss of the light amount.

Figure 4:
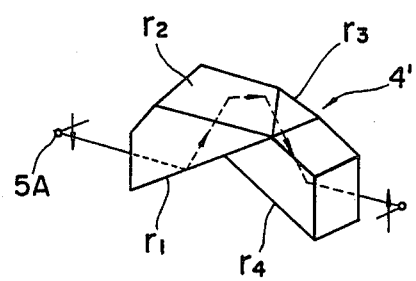
FIG. 4 is likewise a perspective view for explaining another Porro prism.

FIG. 4 illustrates an example of another Porro prism 4' for an erected normal image. In the figure, the flux of light from a light source 5A are reflected on first through fourth reflecting surfaces r1, r2, r3 and r4 respectively, and the incoming light axis and the outgoing light axis are in agreement with respect to each other.

Figure 5:
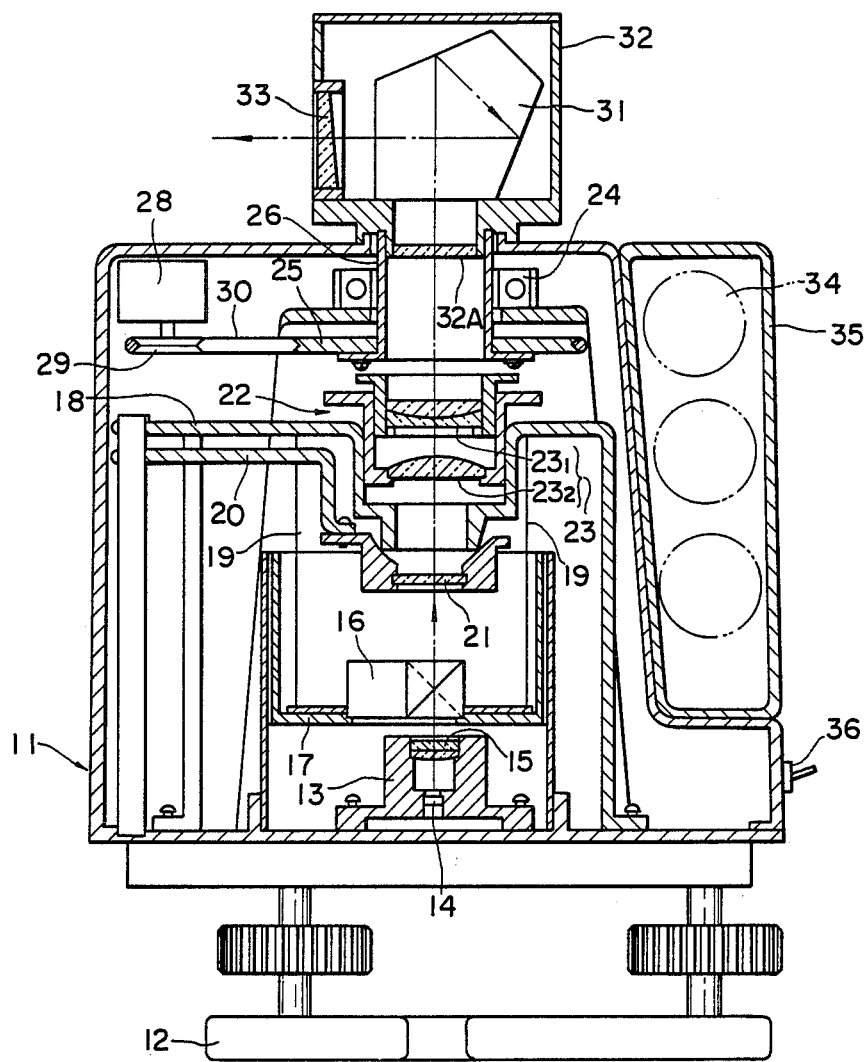
FIG. 5 is a vertical sectional view showing the laser surveying equipment according to one preferred embodiment of the present invention.

FIG. 5 illustrates a laser surveying equipment constituted according to the principle as described in the foregoing. An equipment 11 is installed on an adjustable table 12. A holder 13 is secured to a generally central portion at the bottom of said equipment 11. At the lower portion of said holder 13, a semiconductor laser 14 adapted to serve as a laser beam luminous section is arranged, and a projection lens 15 is arranged upward thereof. A light source of visible light is omitted from the figure, since the same is already described with respect to FIG. 3. A Porro prism 16 for an erected normal image constituting a suspended reflection member is secured to a suspension table 17 above the projection lens 15. Said suspension table 17 is suspended by a ribbon 19 formed of four plastic strings arranged symmetrically with respect to a top board of a supporting frame 18 constituting a part of the equipment 11. Further, beneath the top board of said supporting frame 18, another supporting frame 20 is mounted. A parallel plane glass 21 for adjustment is fitted to said supporting frame 20.

A lens holder 22 is mounted to the top board of said supporting frame 18, and a projection lens 23 comprising two groups of lenses $23_1$, $23_2$ is secured to the lens holder 22. These two groups of lenses $23_1$, $23_2$ are constituted as such that they are adjustable for movement as a unit and that the distance between the lenses $23_1$, $23_2$ is adjustable.

In this way, the laser beam radiated from the semiconductor laser 14 passes through the converging lens 15, the Porro prism 16, the parallel plane glass 21 and the projection lens 23, and finally is radiated upward.

On the other hand, the equipment 1 is provided at the upper portion thereof with a bearing 24, on which a rotary shaft 26 including a pulley 25 is carried. Said pulley 25 has wound around it a belt 30 that is also wound around another pulley 29 axially attached to a motor 28. Because of the foregoing arrangement, the rotary shaft 26 is driven for rotation. Also, at the upper end portion of the rotary shaft 26, a prism house 32 including a pentagonal prism 31 constituting a rotary reflection member is provided. At the incoming light side of said pentagonal prism 31, a window 32A for the incoming light is provided, while at the outgoing light side thereof provided is a prism 33 for adjustment. Said prism house 32 is easily detachably attached to the equipment 1 by means of a simple securing means such as, for example, a machine screw. That is, when the prism house 32 is removed, the device functions as an apparatus which projects laser beam upward in the perpendicular direction. The outgoing light reflected by means of said pentagonal prism 31 is radiated toward a surveying point as a surveying object, and scanned over the surveying object according to the rotation of the rotary shaft 26.

At one side of the equipment 1, a battery box 35 containing therein a battery 34 served as a power source is provided, so that the electric system is operated by a switch 36.

As described in the foregoing, since the laser surveying equipment as shown in FIG. 5 is constituted based on the principle as shown in FIG. 1 and FIG. 2, even if the equipment 1 should be declined and the radiating direction of the laser beam from the semiconductor laser 14 should be displaced, since the length of the ribbon 19 is set to be one half of the focal distance of the projection lens 23, the optical axis of the laser beam radiated from the Porro prism 16 is directed toward the perpendicular direction. Accordingly, the flux of light radiated toward the surveying object from the pentagonal prism 31 is always scanned within a horizontal plane.

Generally, an invisible infrared light is used as a laser beam radiated from the semiconductor laser 14. A detector adapted to photoelectrically detect the infrared laser light is vertically movably mounted on a staff erected at the surveying point in order to carry out a horizontal survey. Because of the foregoing, since the position of the laser beam entering into the detector is often difficult to be determined in a stage prior to the surveying, a visible light source is used in order to detect the approximate position with ease. In other words, the first light source 5' as shown in FIG. 3 may be used as the semiconductor laser, and the second light source 5" may be used as the lamp for radiating a visible light.

Also, the projection lens 23 constituted by two groups of lenses can also be moved as a unit in order to form the incoming laser beam into a parallel flux of light. Furthermore, by changing the distance between the two groups of the lenses, the focal distance thereof can be adjusted, as well. In addition, the parallel plane glass 21 is arranged to be declinable, and the incoming laser beam is adjustable with respect to its outgoing direction. The Porro prism 16 as a suspended reflection member may be a prism for a normally erect image, such as a combination of a plurality of rectangular prisms as shown in FIG. 3, or alternatively a combination of a roof prism and a trapezoidal prism as shown in FIG. 4.

Although the present invention has been described with reference to the preferred embodiment, many modifications and alternations may be made within the spirit of the present invention.

What is claimed is:

1. A laser surveying equipment comprising:
    a laser beam luminous emitting section which is fixed relative to said laser surveying equipment;
    a reflection member for producing an erected normal image, including means located above said laser beam luminous emitting section for upwardly reflecting the laser beam emitted from the laser beam luminous emitting section; and
    a projection lens system which is substantially fixed relative to said laser beam luminous emitting section, and which receives the laser beam reflected from said reflection member and converts the thusly received laser beam to a parallel laser beam;
    suspension means for suspending said reflection member relative to said laser beam luminous emitting section;
    wherein said parallel laser beam from said projection lens is always directed vertically.

2. A laser surveying equipment according to claim 1, wherein said laser beam luminous emitting section includes a semiconductor laser.

3. A laser surveying equipment according to claim claim 1, wherein said reflection member comprises a Porro prism.

4. A laser surveying equipment according to claim 1, wherein said suspension means for suspending said reflection member comprises suspension wires each having a length of approximately one half of a focal distance of said projection lens system.

5. A laser surveying equipment according to claim 1, wherein said suspension means for suspending said reflection member comprises four suspension wires.

6. A laser surveying equipment according to claim 1, wherein said projection lens system has an optical axis which remains colinear with the laser beam from the laser beam luminous emitting section between the laser beam luminous emitting section and the reflection member.

7. A laser surveying equipment comprising:
    a laser beam luminous emitting section which is fixed relative to said laser beam surveying equipment;
    a reflection member for producing an erected normal image which is located above said laser beam luminous emitting section, and which upwardly reflects the laser beam emitted from the laser beam luminous emitting section;
    a projection lens system which is substantially fixed relative to said laser beam luminous emitting section, and which receives the laser beam reflected from said reflection member and converts the thusly received laser beam to a parallel laser beam; and
    a rotary reflection member rotatably arranged in order to displace by approximately 90 degrees an optical path of said parallel laser beam projected from said projection lens system and to scan said parallel laser beam within a horizontal plane toward an object being surveyed;
    suspension means for suspending said reflection member relative to said laser beam luminous emitting section;
    wherein said parallel laser beam from said projection lens system is always directed vertically for entry into said rotary reflection member.

8. A large surveying equipment according to claim 7, wherein said laser beam luminous section comprises a semiconductor laser.

9. A laser surveying equipment according to claim claim 7, wherein said reflection member comprises a Porro prism.

10. A laser surveying equipment according to claim 7, wherein said reflection member is suspended by suspension wires having a length approximately one half of a focal distance of said projection lens system.

11. A laser surveying equipment according to claim 7, wherein said suspension means for suspending said reflection member comprises four suspension wires.

* * * * *